(12) United States Patent
Lynch et al.

(10) Patent No.: US 7,778,893 B2
(45) Date of Patent: Aug. 17, 2010

(54) ACCESS NETWORK OPTIMIZATION METHODOLOGY FOR LEASED SWITCHED AND DEDICATED FACILITIES

(75) Inventors: David Frederick Lynch, Freehold, NJ (US); Moshe Segal, Tinton Falls, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 283 days.

(21) Appl. No.: 12/154,174

(22) Filed: May 21, 2008

(65) Prior Publication Data

US 2009/0292629 A1    Nov. 26, 2009

(51) Int. Cl.
  *G07B 17/00*    (2006.01)
(52) U.S. Cl. .............. 705/30; 379/111; 379/112.01; 379/112.05; 379/112.06; 379/114.01; 379/133; 379/134; 379/220.01; 379/221.02; 379/224
(58) Field of Classification Search .......... 705/30; 379/111, 112
  See application file for complete search history.

(56) References Cited

U.S. PATENT DOCUMENTS

| | | | | |
|---|---|---|---|---|
| 5,067,148 A | * | 11/1991 | Sardana | 379/111 |
| 5,564,021 A | * | 10/1996 | Qiu et al. | 370/460 |
| 5,703,938 A | * | 12/1997 | Lucas et al. | 379/112.05 |
| 5,832,069 A | * | 11/1998 | Waters et al. | 379/115.01 |
| 6,122,294 A | | 9/2000 | Hsu et al. | |
| 6,314,112 B1 | | 11/2001 | Hsu et al. | |
| 6,421,349 B1 | * | 7/2002 | Grover | 370/408 |
| 6,445,710 B1 | | 9/2002 | Perlman et al. | |
| 6,473,426 B1 | | 10/2002 | Killian | |
| 6,539,027 B1 | * | 3/2003 | Cambron | 370/442 |
| 6,598,082 B1 | | 7/2003 | Douglis et al. | |
| 6,665,299 B1 | | 12/2003 | Bellovin et al. | |
| 6,754,843 B1 | | 6/2004 | Lu et al. | |
| 6,779,034 B1 | | 8/2004 | Mundy et al. | |
| 6,781,991 B1 | | 8/2004 | Anderlind | |
| 6,892,169 B1 | * | 5/2005 | Campbell et al. | 703/1 |
| 6,985,497 B2 | | 1/2006 | Hsu et al. | |
| 7,050,555 B2 | * | 5/2006 | Zargham et al. | 379/115.01 |
| 7,583,795 B1 | * | 9/2009 | Florence et al. | 379/133 |
| 2005/0202811 A1 | | 9/2005 | Abed et al. | |
| 2006/0173777 A1 | | 8/2006 | Torres et al. | |

OTHER PUBLICATIONS

Coriolis Networks Announces Strategic Partnership with Crossroads Systems to Provide Carriers with Storage Area Network Service Solutions, Feb. 5, 2001, Business Wire, p. 192.*
Bucholtz, Chris, Shifting Gears, Nov. 18, 1996, Intersec Publishing Corp, vol. 231, No. 21, p. 34.*

* cited by examiner

*Primary Examiner*—Matthew S Gart
*Assistant Examiner*—Talia Crawley

(57) ABSTRACT

A methodology for optimizing the cost associated with access charges incurred by network service providers when leasing communications facilities from a local service provider has been developed that incorporates physical reconfiguration of the access network topology as a cost-saving measure, where and when appropriate. The methodology identifies opportunities to reduce access charges by performing the following functions: (1) moving T1 facilities from one hub location to another; (2) moving T1 facilities from one T3 facility to another (at the same hub location) in order to disconnect unneeded T3 facilities; and (3) adding new T3 facilities in order to reduce overall access expenses and/or to provide new capacity for future growth, including adding potential new hub locations. The methodology is appropriate for use with various types of network facilities, T1 and T3 being considered as exemplary only.

13 Claims, 6 Drawing Sheets

FIG. 4

$$\text{Min} \sum_e c_e x_e + \sum_e \sum_m c_{em} Y_{em} + \sum_m c_m z_m + \sum_m \text{augCost}_m \, a_m + \sum_m \text{discCost}_m \, d_m$$

s.t.

$$x_e + \sum_m Y_{em} = D_e \quad \forall e$$

$$\sum_e Y_{em} - 28 z_m \leq 0 \quad \forall m$$

$$z_m - a_m \leq k_m \quad \forall m$$

$$z_m - a_m + \sum_m d_m \geq k_m \quad \forall m$$

$$\sum_m a_m \leq \text{MaxAug}$$

$$\sum_m d_m \leq \text{MaxDisc}$$

$$\sum_{e \notin S} x_e \leq \text{MaxHubPOP}$$

$$\sum_{e \notin S} x_e + \sum_{e \in S} \sum_{m \neq m_e} Y_{em} \geq \text{CurrentSA} - \text{MaxPOPHub}$$

$$\sum_{e \notin S} x_e \leq \text{MaxHubHub}$$

$$\sum_{e \notin S} x_e - \sum_{e \in S} \sum_{m \neq m_e} Y_{em} \leq \text{MaxRoll} - \text{CurrentSA}$$

FIG. 8

| | A | B | C | D | E |
|---|---|---|---|---|---|
| 1 | LATA 236 | | | | |
| 2 | | CURRENT | PROPOSED | SAVINGS | |
| 3 | Total T1 Cost: | $888,459.36 | $846,509.85 | $41,949.51 | |
| 4 | Total T3 Cost: | $515,258.22 | $454,155.54 | $61,102.67 | |
| 5 | Total Cost: | $1,403,717.58 | $1,300,665.39 | $103,052.18 | |
| 6 | | | | | |
| 7 | T3 utilization | 56.8% | 62.5% | | |
| 8 | Number of T3s: | 911 | 831 | | |
| 9 | Empty T3s: | 208 | | | |
| 10 | Removed 84 T3s: | | | | |
| 11 | Added 4 T3s: | | | | |
| 12 | | | | | |
| 13 | Number of T1s: | 20936 | | | |
| 14 | Stand-alone T1s: | 6444 | 6435 | | |
| 15 | Moved 9 T1s from stand-alone to a hub | | | | |
| 16 | Moved 501 T1s from one hub to another | | | | |
| 17 | Moved 621 T1s from one Mux to another at the same location | | | | |
| 18 | | | | | |
| 19 | Dedicated T1s may be moved to another hub | | | | |
| 20 | Switched t1 facilities may not be moved to another hub | | | | |
| 21 | T1 facilities may be rolled | | | | |
| 22 | | | | | |
| 23 | Total Headroom shortage: 0 T1 slots | | | | |
| 24 | | | | | |

ACCESS NETWORK OPTIMIZATION METHODOLOGY FOR LEASED SWITCHED AND DEDICATED FACILITIES

TECHNICAL FIELD

The present invention relates to a methodology for optimizing the cost associated with access charges incurred by network service providers when leasing communications facilities from a local service provider and, more particularly, to a methodology that incorporates physical reconfiguration of the access network topology as a cost-saving measure, where and when appropriate.

BACKGROUND OF THE INVENTION

Prior to Jan. 1, 1994, all telecommunications switched traffic traversing through a long distance carrier network into a local exchange area was charged an "access" cost based on an equal cost-per-minute basis, with the only modification being that the so-called airline miles between the end office in the local exchange carrier network and the first switch accessed in the long distance network was taken into account. As a result, the cost that was charged to a long distance carrier was substantially independent of the actual route the traffic took through the local exchange area to the end users. Accordingly, the long distance carrier did not have to be concerned about how the calls themselves were carried by the local access providers, as long as the calls reached the end users.

All of that changed when the Federal Communications Commission (FCC) announced that after Jan. 1, 1994, the "access charges" paid by long distance carriers would more accurately reflect the true cost of access. To introduce this restructuring of the cost the FCC introduced the concept of local transport restructuring (LTR). In essence, LTR separates the switched access costs into three different components: (1) the cost charged by an access provider for a long distance carrier to use its facilities connecting a carrier's "Point-of-Presence" (POP) to a switch in the local exchange network (the "Entrance Facility charge"); (2) a fixed "per mile" cost for direct trunk lines into the local exchange area that are leased by a long distance carrier; and (3) overflow traffic volume from leased direct trunks onto the local exchange's "tandem" trunks, where this cost factor comprises both a minutes-of-use charge and a cost of the trunk groups from the tandem switch to the POP. Typically, these component costs are monthly charges, and are available to the public in published tariffs.

As of today, there is an alternative form of access network pricing, referred to as Equal Change Rule (ECR) pricing, available to the long distance carrier. Under ECR pricing, access charges are based solely on the number of minutes of use and the number of miles between a subscriber's local exchange carrier end office (EO) and the long distance carrier's POP.

In view of the changes to the cost structure, from the perspective of a long distance carrier or a wide area service provider, a cost problem has evolved that is essentially defined as a capacity problem. That is, the long distance service provider needs to determine, in advance, how many direct trunks it should lease and how much traffic should be allowed to overflow onto tandem trunks in order to achieve a specific grade of service for its subscribers, at a minimum cost. Given the fact that a long distance carrier pays out a significant portion of its revenue as "access charges", the ability for a long distance carrier to optimize its access trunk configurations so as to minimize its access costs is of strategic importance.

Various attempts have been made to develop a rules-based approach for determining the optimal balance between direct trunks and access tandem trunks. While helpful in determining the balance for a rather "static" and predictable volume of traffic, these tools have not been able to handle the complexities associated with factors such as, for example, parallel trunk groups, multiple tandem switches for a single end office, variations in traffic peaks, day-to-day variations in traffic, or seasonal variations in traffic.

Recently, a methodology has been developed for optimizing the cost associated with access charges incurred by network service providers when leasing communications facilities from a local service provider. This methodology utilizes a pair of separate "optimization modules" that are iterated to determine the optimal arrangement on a cost basis. A first optimization module (referred to as a "sizing" module) is used to determine the optimal number of direct trunks, as well as the balance between direct trunks and access tandem trunks for each end office location. A second optimization module (referred to as a "location" module) utilizes a mixed-integer program model to determine the optimal multiplexing arrangement for a defined geographic area of the access network, such as a Local Access Transport Area (LATA). The iteration between these two modules then determines a minimum-cost switched access network arrangement between the long distance carrier and the local exchange area. The details of this approach are disclosed in U.S. Ser. No. 11/214,440 entitled "Switched-Access Network Optimization Methodology" (Florence et al.), which is assigned to the assignee of this application and incorporated herein by reference. Similar cost issues are known to arise for communication companies with respect to the leasing of "dedicated" facilities for non-switched services (such as, for example, private line service) that may carry packetized data traffic (e.g., IP, ATM, frame relay, and the like).

While the above-described Florence et al. arrangement does adjust trunk group sizes (high-usage trunk groups from EO to POP, and tandem trunk groups from tandem to POP) to reduce T1/T3 transport charges and minutes-of-use charge, it does not provide for any modifications to the actual transport network itself, where additional cost savings may be found by re-configuring the various network components.

Thus, a need remains in the art for a methodology that may be used by managers of large, complex long distance networks to optimize its use of switched and dedicated access facilities into a local exchange area, including physical changes to the network itself.

SUMMARY OF THE INVENTION

The need remaining in the art is addressed by the present invention, which relates to a methodology for optimizing the cost associated with access charges incurred by network service providers when leasing communications facilities from a local service provider and, more particularly, to a methodology that incorporates physical reconfiguration of the access network topology as a cost-saving measure, where and when appropriate.

In accordance with the present invention, a methodology has been developed that identifies opportunities to reduce access charges by performing the following functions: (1) moving T1 facilities from one hub location to another; (2) moving T1 facilities from one T3 facility to another (at the same hub location) in order to disconnect unneeded T3 facilities; and (3) adding new T3 facilities in order to reduce overall access expenses and/or to provide new capacity for future growth, including adding potential new hub locations.

It is an aspect of the present invention that the network under review is first partitioned into logical sections, where each section is reviewed independently. For example, in the US telecommunications market, it is useful to study one LATA at a time (LATA being a definition of a "Local Access Transport Area").

The method of the present invention can be defined as a two-part approach, where the first part includes a mixed integer programming (MIP) model analysis to determine an optimal number of T3 and T1 facilities, with a set of given constraints (such as ensuring that each T1 facility is assigned to a path and ensuring that a sufficient number of T3 facilities are allocated for each hub location). In the second step, the results of the MIP analysis are used to create the specific assignments that will provide the most economical architecture.

It is proposed that the methodology of the present invention be employed in an on-going basis to update the T1/T3 assignments as network needs change. A predetermined threshold savings value (for example, $50) may be established in order to eliminate unnecessary network churn associated with minimal savings.

It is to be understood that the methodology of the present invention is equally applicable to various other types of network arrangements and facilities including, but not limited to, DS0/T1 optimization and T3/OC48 optimization. Indeed, multi-level optimization schemes are also possible, including each of these various types of communication media.

Other and further aspects and advantages of the present invention will become apparent during the course of the following discussion, and by reference to the accompanying drawings.

BRIEF DESCRIPTION OF THE DRAWINGS

Referring now to the drawings,

FIG. 4 is an illustration of an exemplary mixed integer program model that may be used to optimize the access network architecture for both switched and dedicated (leased) facilities in accordance with the present invention;

FIG. 8 illustrates a hypothetical report that may be generated subsequent to performing the optimization process of the present invention.

DETAILED DESCRIPTION

In order to best understand the cost savings benefits of the methodology of the present invention, it is helpful to understand an exemplary network architecture as it exists within the access arrangements between an interexchange (i.e., long distance) carrier and a local service provider. While the particular architecture may differ in various circumstances, the individual components forming these networks are essentially the same. An understanding of the location and operation of these individual components is an important aspect for properly understanding the cost saving benefits of the present invention.

Figure 1:
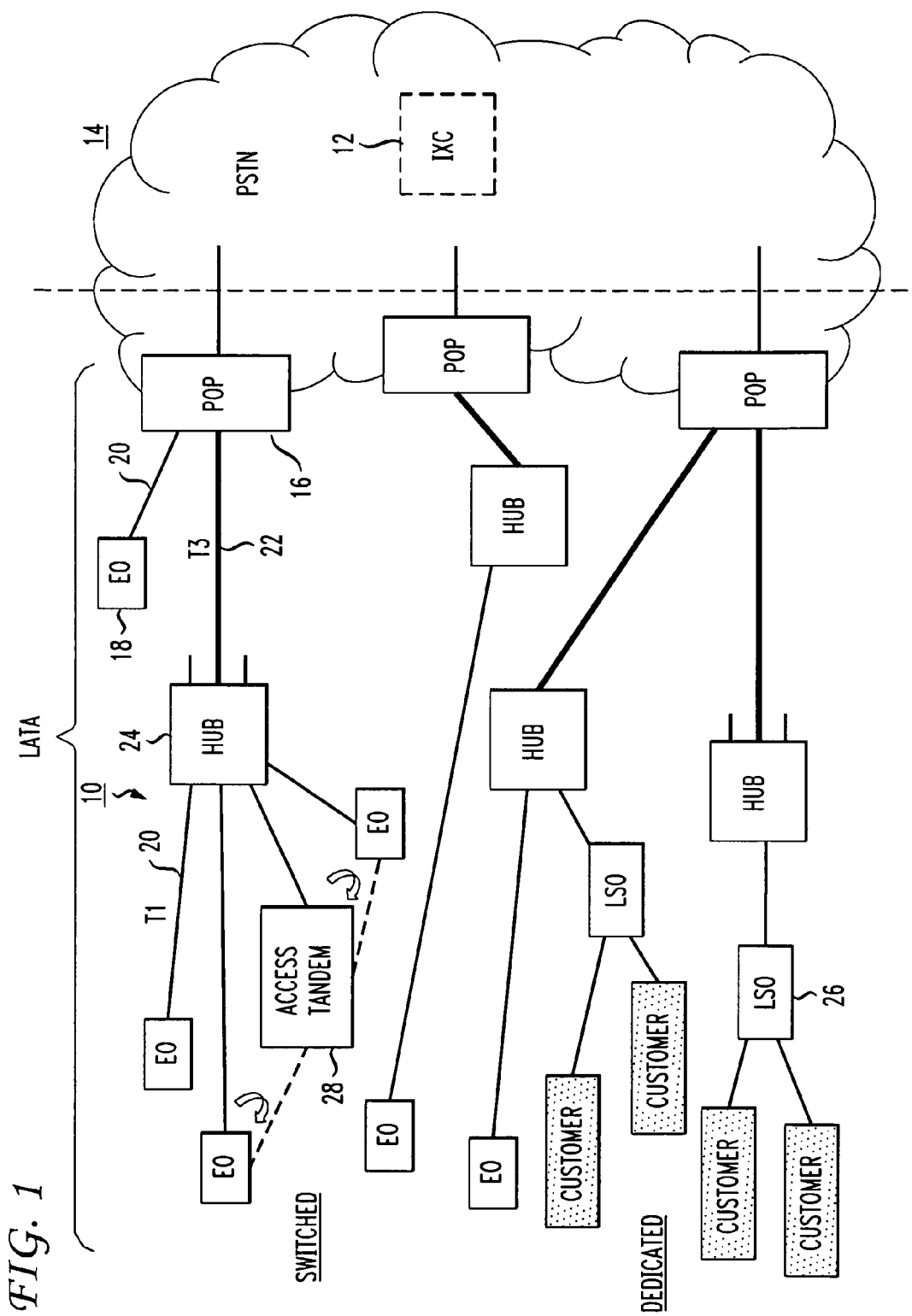
FIG. 1 illustrates, in simplified form, a portion of the interconnection between a long distance carrier's network and a local exchange area, particularly illustrating the various components involved in access charges.

FIG. 1 illustrates an exemplary network architecture associated with a specific "partition" of a local network, in this case a particular Local Access Transport Area (LATA) 10. In general, an interexchange carrier 12 supports voice and data traffic carried by switches and dedicated facilities within a larger network 14 (such as the public switched telephone network, or PSTN also shown in FIG. 1). Interexchange carrier 12 owns/controls a plurality of locations 16 referred to hereinafter as "Points Of Presence", or POPs, that are used to house switches for voice traffic and cross-connects for dedicated facilities. Generally speaking, POPs 16 allow carrier 12 to provide communication into/out of LATA 10. In the diagram of FIG. 1, a set of three POPs 16 is shown.

From the customer point of view, FIG. 1 illustrates two types of access connections into LATA 10 that may be used. The first type of access, defined as "switched" access, is the typical connection used by residential customers and small businesses, where their individual telephone lines (trunks) are typically coupled into an "end office" 18, hereinafter referred to as EO 18. Each EO 18 functions to group together the separate telephone lines from different customers to form a T1 transport facility 20. In accordance with pre-defined telephony architecture parameters, up to twenty-four trunks may be combined within each EO to form one T1 "facility".

Each T1 facility is then either coupled directly to a POP 16, or (more typically) terminated at a hub location 24, where up to twenty-eight separate T1 facilities can be multiplexed together to be communicated over a single T3 transport facility 22. Referring to FIG. 1, a plurality of hub locations 24 are shown as providing this ability to multiplex a plurality of separate incoming T1 facilities 20 onto a single outgoing T3 facility 22. Each hub location 24 may include one or more separate multiplexers for providing the communications between the T1 and T3 facilities. T3 facilities 22 are shown as being coupled to POPs 16, completing the communication path between the end customers and interexchange carrier 12. In some instances, an EO 18 may be directly connected to a POP 16 via a T1 facility 20, as also shown in FIG. 1. This type of connection is also referred to in the art as a "stand-alone" T1 facility. For definitional purposes of the present invention, the T1 facility can be thought of as a "first level", or "lower level" facility and the T3 facility can be thought of as a "second level", or "upper level" facility.

The second type of access, referred to as "dedicated" access, describes an exemplary business connection between a "customer" and a LEC serving office (LSO) 26. These connections are leased for private line service, as well as to carry data traffic (e.g., IP, frame relay, ATM). In use, dedicated access functions as a permanent connection between the customer and LSO 26 and will always be available to that customer. Each LSO 26 is shown as using a T1 facility 20 to connect with a hub 24. As also shown in FIG. 1, a particular hub may have as inputs both switched access lines over a first group of T1 facilities and dedicated access lines over a second group of T1 facilities. In various instances, the EO, LSO, hub and/or POP may be located within the same building.

Figure 2:
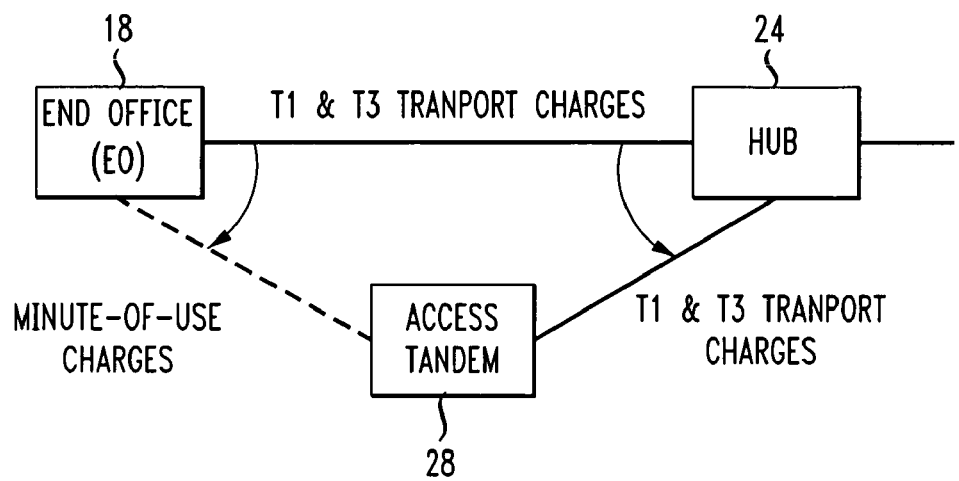
FIG. 2 illustrates a specific portion of the network architecture of FIG. 1, showing the connection to a hub through an access tandem switch.

In contrast to the "dedicated" access, "switched" access may, at times, be overloaded to the point that a connection is not available. In this case, some of the overflow traffic may be directed to an access tandem switch 28 between an EO 18 and a hub 24. FIG. 1 illustrates such a connection within the architecture and FIG. 2 shows this connection in detail. For the purposes of the present invention, the use of an access tandem introduces other charges, including a "minutes-of-use" charge and an access tandem charge.

Using the above definitions and illustrations of network components, the current (relevant) tariff charges (in the United States) can be broken down as follows:

Transport charge from an EO to a hub (fixed and mileage-based components)

Transport charge from an LSO to a hub (fixed and mileage-based components)

Transport charge from an EO directly to a POP (fixed and mileage-based components)

Multiplexing charges at a hub

"Entrance Facility" charges for switched traffic access to a POP

"Channel Termination" charges for dedicated traffic access to a POP

Minutes-of-use charges for switched traffic using an access tandem

The optimization methodology of the present invention is utilized to determine the minimum cost configuration of switched, dedicated and shared T1 and T3 facilities in the access network, subject to a variety of operational constraints. In one instance, for example, economies of scale allow that the cost of a single T3 facility will be, in general, less expensive than the cost of 28 T1 facilities. Similar scaling comes into play between other levels within a communication network (e.g., one T1 facility vs. 24 DS0 facilities, one OC48 facility vs. 48 T3 facilities, that is, between a multiple number of "lower, first level" facilities and a single "upper, second level" facility). As will be described in detail below, the methodology of the present invention first partitions the access network into logically-definable sections, considered for the purposes of this discussion to comprise the separate, well-defined LATAs. Then, for each LATA, the methodology identifies opportunities to reduce access charges by: (1) moving T1 facilities from one hub location to another; (2) shifting T1 assignments from one T3 facility to another at the same hub in order to disconnect unneeded T3 facilities; (3) adding new T3 facilities in order to reduce overall access expenses and/or to provide new capacity for growth; and (4) testing the economic viability of adding new hub locations.

As an outgrowth of U.S. Ser. No. 11/214,440 (incorporated herein by reference), the methodology of the present invention uses switched traffic load forecasts to determine the optimal sizes of the high-usage and tandem trunk groups and, further, proposes cost-savings changes to the transport network itself. In particular, it has been observed that access charges may be reduced by moving selected T1 facilities to different T3 facilities. As a result, the number of required T3 facilities can be reduced, as well as the total costs of T1 and T3 transport. Moreover, this process can be applied to dedicated access services as well as switched access services.

Indeed, while the remainder of the discussion of the methodology of the present invention will focus on the optimization of T1 and T3 facility assignments, it is to be understood that the same process is equally applicable to other levels of network communication, such as DS0/T1 multiplexing optimization, T3/OC48 multiplexing optimization, and the like. Moreover, the methodology of the present invention may be implemented repeatedly for various levels of interconnection (such as performing both T1/T3 optimization and T3/OC48 optimization), providing a multi-level optimization solution. For the sake of clarity, however, the following discussion will focus on an implementation in the T1/T3 environment so as to not unduly complicate an understanding of the various parameters considered in the optimization process.

In accordance with the present invention, a minimum cost T1/T3 access network is configured (and re-configured, on an on-going basis) using a two-part process. The first part of the process consists of solving a mixed integer programming (MIP) model to determine the optimal number of T3 facilities between each hub location and a POP, and to also determine the optimal number of T1 facilities at each EO/LSO to be assigned to the various hub locations. Constraints, as described below, ensure that all T1 circuits are assigned to a path and that a sufficient number of T3 facilities are assigned to each hub to support the maximum allowed traffic. The second part of the process uses a heuristic model (hereinafter also referred to as a "grooming module") to convert the MIP output into specific circuit and facility assignments.

Access tariffs include both monthly recurring costs and non-recurring costs, typically in the form of installation charges. To incorporate both types of charges in the cost saving methodology of the present invention, non-recurring costs are divided by a payback factor to create a cost per month. For example, this payback factor may be set to six months. Further, to reduce unnecessary churn, all network changes should first satisfy a minimum savings threshold. Then, if the average savings produced by a rearrangement activity is less than the minimum savings threshold, a "no change in network" action is recommended. For example, a threshold default value of $50 may be used.

Mixed Integer Program Model

The optimal design of the T1 and T3 access network in accordance with the present invention is accomplished by first solving a mixed integer programming model. The following parameters are used to provide the solution:

$c_e$: cost of a stand-alone T1 facility from endpoint e to its associated POP;

$c_{em}$: cost of a T1 facility from endpoint e to hub location m;

$c_m$: cost of a multiplexer and a T3 facility from hub location m to its associated POP; and $D_e$: total number of T1 facilities required at endpoint e.

In the above, an "endpoint" may be an EO or LSO, and the cost parameters are defined to include all relevant costs. That is, in addition to the tariffed monthly recurring charges, these costs may also include non-recurring (e.g., installation) charges divided by the payback period, as described above. Again, to reduce churn, the costs should also include a minimum savings charge whenever the homing point (POP or hub) is different from the current homing point. Additionally, the following variables are used:

$x_e$: number of stand-alone T1 facilities from endpoint e to its associated POP;

$y_{em}$: number of T1 facilities from endpoint e to hub location m; and $z_m$: number of T3 facilities from hub location m to its associated POP.

Given these constants and variables, the objective is to minimize the total cost of T1 and T3 facilities, expressed as follows:

$$\text{Min} \sum_e c_e x_e + \sum_e \sum_m c_{em} y_{em} = \sum_m c_m z_m,$$

where the total number of T1 facilities at each endpoint e must equal the total demand:

$$x_e + \sum_m y_{em} = D_e, \forall e.$$

Additionally, there must be enough T3 facilities at each hub location to carry all of the T1 facilities that are "homed" to that location (recalling that one T3 facility can support up to 28 T1 facilities):

$$\sum_e y_{em} - 28 z_m \leq 0, \forall m.$$

Finally, all of the variables must remain nonnegative quantities and the number of T3 facilities must be an integer:

$$x_e, y_{em}, z_m \geq 0 \; \forall e, m$$

$$z_m \text{ integer } \forall m.$$

It is to be understood that there may be instances where it is not feasible (or permissible) to move T1 facilities from a specific endpoint to a specific POP or hub location. These restrictions can be easily incorporated by simply setting the appropriate $c_e$ or $c_{em}$ parameter to a sufficiently large value. There may also be instances where some of the T1 facilities at an endpoint cannot be moved at all, and must therefore be excluded from the network optimization process. These restrictions can be handled in the model by setting a lower bound on the appropriate $x_e$ or $y_{em}$ variable representing the current T1 arrangement.

Figure 3:
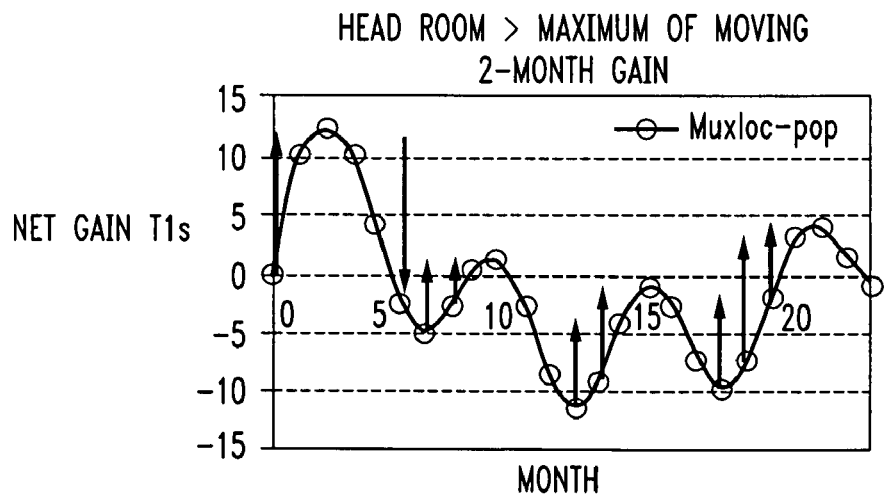
FIG. 3 contains a chart showing a variation in T1 demand at a specific hub location on a month-to-month basis.

The basic mixed integer model as outlined above presumes a "static" network. In reality, circuits and facilities are constantly being added to, or removed from, the network. As a result, a perfectly optimized static network (in terms of "least cost") would most likely not include any room for growth (or churn). To be functional, a network needs a certain amount of spare capacity (i.e., headroom). For example, FIG. 3 illustrates a hypothetical T1 demand pattern at a selected hub over a two-year period. The solid arrows illustrate net gains over various two-month intervals, and the dotted arrow is associated with a net loss over the same interval. If the lead time for ordering a new T3 facility is two months, then an existing hub requires "headroom" equal to or greater than the largest predicted two-month growth in T1 demand. One study has provided the following information regarding headroom requirements (for a 95% confidence interval and presuming a two-month T3 order interval):

| Number of T1 facilities homing onto a selected hub location | Number of spare T1 facilities to be assigned to selected hub location |
|---|---|
| 1-28 | 3 |
| 29-56 | 5 |
| 57-84 | 6 |
| 85-140 | 8 |
| 141-196 | 10 |
| 197-280 | 13 |
| 281-420 | 15 |
| 421-560 | 17 |
| 561-840 | 20 |
| 840+ | 38 |

By studying the above, it has been determined that headroom requirements can be incorporated into the above MIP model by designating a set of "virtual" T1 facilities (i.e., "headroom T1 facilities"), where:

$h_e$: number of stand-alone headroom T1 facilities from endpoint e to its associated POP;

$h_{em}$: number of headroom T1 facilities from endpoint e to hub location m; and $H_e$: total number of headroom T1 facilities required at endpoint e, where $$h_e + \sum_m h_{em} = H_e \; \forall e.$$

Given this constraint, the total number of T3 facilities at each hub location m must be sufficient to carry not only the total number of existing T1 facilities assigned to that hub, but also the assigned headroom T1 circuits, or:

$$\sum_e y_{em} + \sum_e h_{em} - 28 z_m \leq 0 \; \forall m.$$

If the cost of adding a new T3 facility is greater than the incremental cost of moving the excess T1 facilities to another hub, the model of the present invention proposes moving a headroom T1 circuit instead of an existing T1 circuit. To force this result, headroom T1 circuits can be defined as "less costly" than existing T1 circuits by not assigning any non-recurring charges (i.e., installation charges) to the headroom T1 circuits.

The act of adding "headroom" T1 facilities to the network may result in the initial state of the network appearing to be infeasible. This is a result of the situation wherein the number of existing T1 facilities plus the number of headroom T1 facilities at a particular T3 hub location may be greater than twenty-eight times the number of associated T3 facilities at the hub. However, if the headroom T1 facilities are always permitted to move to a stand-alone configuration, then the model will still yield a feasible solution. To insure this result, a default stand-alone headroom T1 cost parameter is added for situations where the pricing data is unavailable.

In light of actual physical network constraints, it may also be desirable to limit the number of T3 facilities that may be added to or disconnected from a network (or modify the assigned cost accordingly). Similarly, it may be advisable to limit certain types of T1 facility movements. For example, there may be a physical limit on the number of T3 facilities available at a particular hub location, or a limit on the total number of adds/disconnects. Furthermore, there is usually a cost associated with the act of adding or disconnecting a T3 facility.

Thus, to model the above-mentioned T1 facility constraints, the follow set of parameters may be defined and considered:

MaxHubPOP: maximum number of T1 facilities that can be moved from a hub to a stand-alone configuration
MaxPOPHub: maximum number of T1 facilities that can be moved from a stand-alone configuration to a hub
MaxHubHub: maximum number of T1 facilities that can be moved from a first hub to a second hub
MaxRoll: maximum total number of T1 facilities that can be moved in general.

In addition to these parameters, the following set of network-defined constraints apply:

CurrentSA: current number of stand-alone T1 facilities
S: set of all endpoints currently configured as stand-alone elements
$m_e$: the hub location where T1 facilities at endpoint e are currently terminated.

Using these parameters, constraints can be added to limit the number of T1 facility movements as follows:

$$\sum_{e \notin S} x_e \leq MaxHubPOP$$

$$\sum_{e \in S} x_e \geq CurrentSA - MaxPOPHub$$

$$\sum_{e \notin S} \sum_{m \neq m_e} y_{em} \leq MaxHubHub$$

$$\sum_{e \notin S} x_e - \sum_{e \in S} x_e + \sum_{e \notin S} \sum_{m \neq m_e} y_{em} \leq MaxRoll - CurrentSA$$

To model the above-described T3 facility constraints, an additional set of variables and constraints are added and defined as follows:

Variables:
$a_m$: the number of T3 facility additions at hub location m
$d_m$: the number of T3 facility disconnects at hub location m
$k_m$: the current number of T3 facilities at hub location m User-Defined Constrained Parameters:
MaxAug: the maximum possible number of T3 facility additions
MaxDisc: the maximum possible number of T3 facility disconnects.

The number of T3 facility additions at a hub location m must be greater than or equal to the difference between the proposed and current number of T3 facilities. Assigning an "augment cost" to $a_m$ will force equality whenever the number of additions is nonnegative, that is:

$z_m - a_m \leq k_m \; \forall m,$ $a_m \geq 0 \; \forall m.$

Similarly, the number of T3 facility disconnects $d_m$ at hub location m must be greater than or equal to the difference between the current and proposed number of T3 facilities, after adjusting for any augments. Again, assigning a "disconnect cost" to $d_m$ will force equality whenever the number of disconnects is nonnegative:

$z_m - a_m + d_m \geq k_m \; \forall m,$ $d_m \geq 0 \; \forall m.$

Finally, constraints to limit the total number of T3 additions and disconnects may be defined as follows:

$$\sum_m a_m \leq MaxAug$$

$$\sum_m d_m \leq MaxDisc$$

It is possible that the above-described mixed integer program model will assign T1 facilities from the same endpoint to two (or more) different hub locations, particularly when attempting to reduced the total number of T3 facilities required in the network. This type of configuration is acceptable for dedicated circuits and facilities, but is generally not permitted for switched circuit arrangements. To prevent this from occurring, additional binary variables and constraints may be added that will "force" all T1 facilities from a given endpoint e to terminate at the same m. Consider the following variables:

$u_e$: equals "1" if there is at least one T1 facility from endpoint e to its POP
$v_{em}$: equals "1" if there is at least one T1 facility from endpoint e to hub location m.

The binary variable corresponding to a homing point must be set if there is one or more T1 facilities assigned to that homing point, that is:

$x_e - D_e u_e \leq 0 \; \forall e$ $y_{em} - D_e v_{em} \leq 0 \; \forall e, m.$ Where applicable, the model can constrain the T1 facilities at an endpoint to have no more than one homing point (that is, no more than one binary variable can be set for each endpoint):

$$u_e + \sum_m v_{em} \leq 1 \; \forall e.$$

The addition of these constraints for T1 and T3 facilities thus yields the relation for access network optimization as shown in FIG. 4. Simply stated, the objective of the MIP model of the present invention is to obtain the following results (including both existing and headroom T1 facilities):

Minimize the total cost of T1 and T3 facilities, subject to the following:
the number of T1 facilities at each endpoint is equal to the "demand"
the number of T3 facilities at each hub is greater than or equal to the number of associated T1 facilities divided by 28
all "addition" and "disconnect" limits for T3 facilities are satisfied
all T1 facility movement constraints are satisfied The cost parameters should include all of the relevant costs. For example, the cost of a T1 facility should include not only the monthly recurring cost, but also a rearrangement cost and a minimum savings cost, if the proposed assignment differs from the current assignment. The T3 facility "addition" cost should include installation and minimum savings cost, and the T3 facility "disconnect" cost should include minimum savings and any early termination penalties.

The solution of the MIP model provides the optimal hubbing assignment for each group of T1 facilities, as well as the optimal number of T3 facilities at each hub location. In accordance with the present invention, the results of this process are then passed onto the second part of the process—determining the identity of these various elements.

Grooming Module

The results determined by utilizing the matrix of equations given above yields a specific number of T1 facilities to be moved, as well as a specific number of T3 facilities that should be added and/or deleted. In accordance with the present invention, the grooming module determines the specific T1 and T3 facility assignments, based on the output of the MIP model. In particular, the grooming module performs the following operations:

add proposed T3 facilities;
identify the T3 facilities to be disconnected;
identify the T1 facilities to be moved to different hub locations;
select a specific T3 assignment for the moved T1 facilities;
clear all T3 facilities to be disconnected by moving their associated T1 facilities to other T3 facilities at the same hub location;
assign T1 and T3 activities to "projects"; and
remove "projects" that do not exhibit positive savings.

Figure 5:
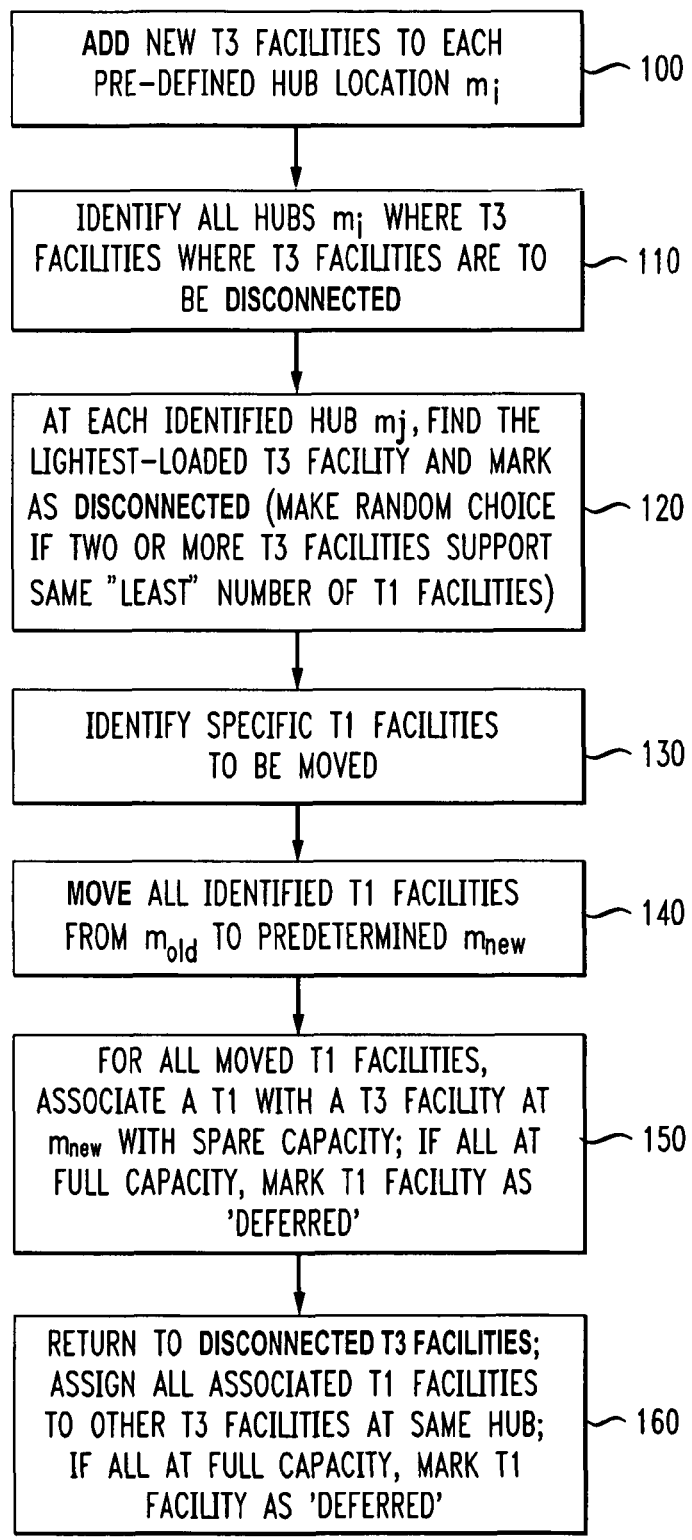
FIG. 5 is a flowchart illustrating an exemplary process for performing the mixed integer program aspect of the present invention FIG. 6 contains a diagram illustrating the movement of specific T1 facilities from one T3 facility to another, in order to reduce the number of T3 facilities required at a specific hub location.

FIG. 5 contains an exemplary flowchart illustrating this grooming process, which will be described in detail below. Referring to the flowchart, step 100 defines the initial step in the grooming process, which is simply to add new T3 facilities at the various locations defined by the first part of the process. Next, the process continues to step 110, associated with disconnecting T3 facilities from one or more hub locations. At step 110, the hub or hubs at which T3 facilities are to be disconnected are identified. At each hub, the set of T3 facilities are analyzed (step 120) to find those with the fewest assigned T1 facilities (provided that one or more of the T1 facilities have not been excluded, for reasons discussed above). Additionally, there may be occasions where one or more T1 facilities cannot be moved. In these cases, the identified T1 facilities are excluded from the optimization process of the present invention. In the case of a "tie", a T3 facility is selected arbitrarily. These T3 facilities are then designated to be disconnected (step 120).

At this point, a selection is made to identify specific T1 facilities to be moved (step 125). In particular, when selecting T1 facilities to move to another hub location, the process first considers T1 facilities associated with a T3 facility that is designated to be disconnected. If additional T1 facilities need to be moved, the process then looks to move those T1 facilities associated with the T3 facilities having the fewest number of connected T1 facilities (provided, however, that one or more of the T1 facilities have not previously been flagged as not available to be moved).

For each T1 facility to be moved to a different hub location (step 130), the grooming module chooses a T3 facility at that new hub location which has spare capacity (and is not 'marked' for being disconnected), shown as step 140. If no such T3 facility is found, then the module selects a T3 facility that will have sufficient spare capacity once other T1 facilities on that T3 facility are moved. In these cases, the T1 facility-to-be-moved is marked as "deferred".

Figure 6:
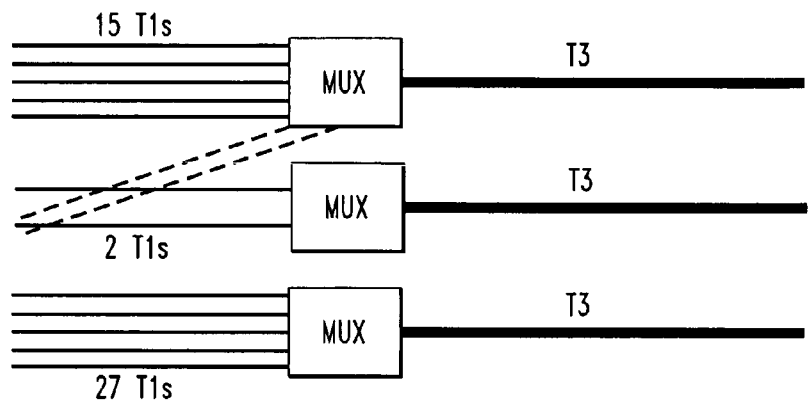

For each T3 facility to be disconnected, the grooming module then checks for associated T1 facilities that have not already been designated to be moved (step 150). For each of these T1 facilities, the module then finds another T3 facility at that location with capacity to handle the T1 facility, as shown in FIG. 6. If no such T3 facility can be found, the module selects a T3 facility that will have sufficient spare capacity once other T1 facilities have been moved and marks the relevant T1 facility move as "deferred".

Figure 7:
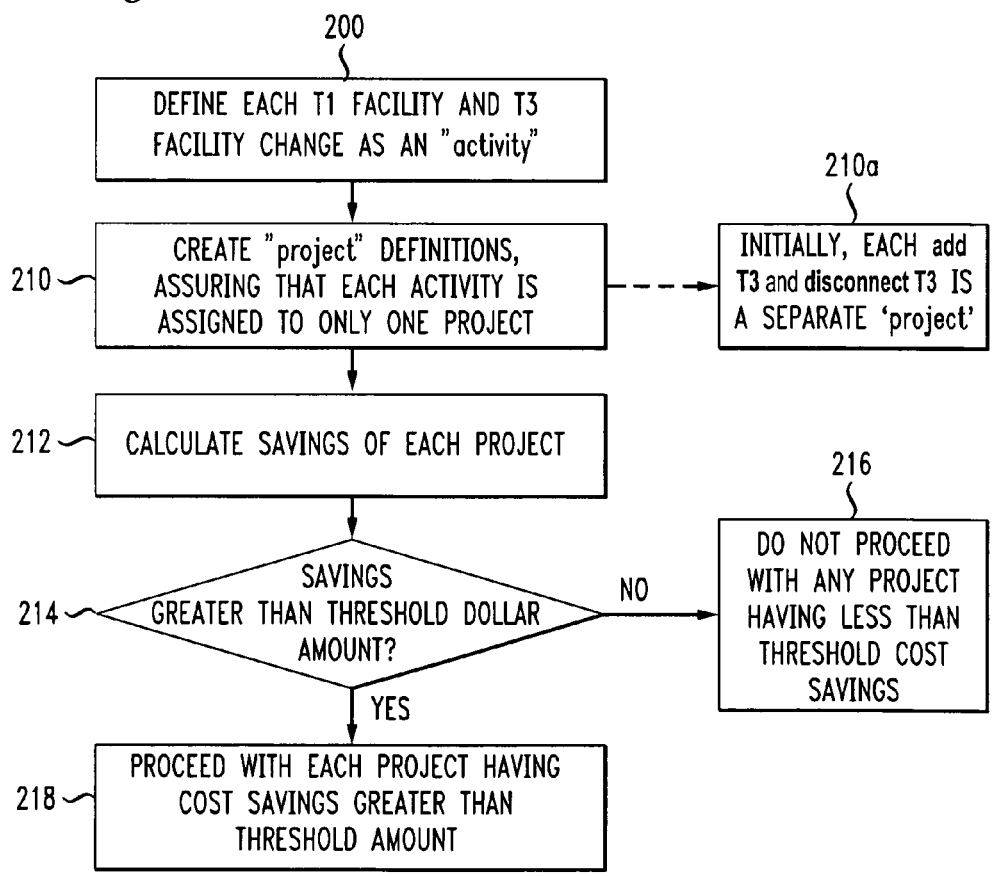
FIG. 7 is a flow chart illustrating the actual T1 and T3 assignment changes performed by the grooming module in accordance with the present invention.

After all of the specific T3 additions and disconnects and T1 moves have been identified, the grooming module then assigns the 'activities' to self-contained 'projects', as shown in steps 200 and 210 of the flowchart of FIG. 7. In this context, a 'project' is defined as a collection of activities that can be performed independently of any other project. Ideally, a 'project' should be the smallest set of activities that still achieves the proposed savings. For example, one 'project' may be to disconnect one T3 facility and move all of its T1 facilities to one or more T3 facilities. (The T3 disconnect savings cannot be achieved without first moving the connected T1 facilities). If one or more T1 facilities is to be moved to a proposed new T3 facility, then the 'activity' of adding that T3 facility should be included in the definition of that 'project'. A deferred T1 move should be included in the same project as the corresponding T1 facility that must be moved first.

Initially, a 'project' is created for each T3 facility to be added, as well as for each T3 facility to be disconnected (shown in step 210a). Next, the grooming module considers each T1 facility move. If either the current T3 or the new T3 facility is part of a project, then the T1 facility move is added to the same project. If the T3 facilities are part of different projects, then the grooming module merges the two projects. If neither T3 facility is part of a project, then the module creates a new project. Finally, the module matches each deferred T1 circuit move with a required T1 circuit move. To avoid undesirable dependencies, the module calculates a "score" for each T1 facility move that can be matched with the deferred T1 facility move. For example, if a T1 facility is not in the same project as the deferred T1 facility, it is scored 1 point. If a T1 facility is itself a pending move, it scores 2 points. If a T1 facility is being moved to a proposed additional T3 facility, it scores 4 points. If a T1 facility is being moved to the same T3 facility that the deferred T1 facility is being moved from (thus forming a dependent loop), it scores 8 points. The T1 facility move with the lowest score is then matched with the deferred T1 move, and their two projects are merged.

The cost savings of each project is then calculated (step 212) and compared to a predetermined savings threshold (214). If the savings is insufficient (step 216), the project is rejected. However, if the savings is greater than the threshold amount, the project proceeds as scheduled. FIG. 8 includes a hypothetical report of savings within one LATA that was found by implementing the process of the present invention.

It is to be understood that some projects may yield a savings of 'zero' (or even negative). This may be the result of the methodology of the present invention proposing a new T3 facility to provide headroom capacity for new growth, or it may be because the model is proposing to move an existing T3 facility to a more expensive hub location, in order to create more headroom capacity at a current hub location. In either case, the reported project savings do not include the cost of assigning headroom requirements to a distant hub location. Since planners may choose not to implement a project consisting of only a single T1 facility move that does not appear to provide a cost savings, the threshold may be set to remove all such projects. However, T1 facility moves with small but positive savings (for example, less than $10) can provide better placement of headroom capacity in addition to the small, incremental savings and, as a result, should be permitted to remain in the solution.

Inasmuch as the present invention is subject to many variations, modifications and changes in detail, it is intended that all matter described throughout this specification and shown in the accompanying drawings be interpreted as illustrative only, and not in a limiting sense. Accordingly, it is intended that the present invention be limited only by the spirit and scope of the claims appended hereto.

What is claimed is:

1. A method of optimizing access network costs for a carrier requiring switched facilities, dedicated facilities and multiplexers at hub locations to form an access network topology comprising at least a first, lower level of facilities and a second, higher level of facilities, the multiplexers for combining a plurality of N first level facilities onto a single second level facility, the method comprising the steps of: a processor performing a minimal cost analysis to determine the optimum number of first and second level facilities by: moving first level facilities from a first hub location to a second hub location; re-assigning first level facilities from one second level facility to another second level facility at the same hub location; and adding or disconnecting second level facilities based upon the movement and reassignment of first level facilities; wherein cost analysis is performed using the relation:

$$minZcexe+Z\ Z\ CemYem^+Z¢mZm^+Z^{auqCOslmam}+Z\ discCostmdm, m\ tlq$$

where ce is a predetermined cost of a first level facility from an endpoint e to a network access point (a stand-alone first level facility), xe is defined as a number of first level stand-alone facilities from an endpoint e to a network access point, Cem is a predetermined cost of a first level facility from endpoint e to a hub location m, Y~m is defined as a number of first level facilities from endpoint e to the hub m; Cm is a predetermined cost of a multiplexer and a second level facility at hub m; z., is defined as a number of second level facilities from hub m to a network access point; auqCostm is a predetermined cost for adding second level facilities at hub m; discCost.,is a predetermined cost for disconnecting second level facilities from hub m; a., is defined as a number of second level facilities to be added at hub m; and dm is defined as a number of second level facilities to be disconnected at hub m.

2. The method as defined in claim 1 wherein the number of first level facilities at each endpoint e is at least sufficient to satisfy the current demand and the number of second level facilities at each hub location is least equal to the number of first level facilities divided by N.

3. The method as defined in claim 1 wherein at least one value of $x_e$ or $y_{em}$ is determined to include an additional headroom amount of first level facilities, accounting for changes in the demand of first level facilities over time.

4. The method as defined in claim 1 wherein the method further comprises the step of
limiting the number of first level facility movements and reassignments based upon a plurality of predetermined constraints selected from the group consisting of: a maximum number of first level facilities to be moved from a hub to a stand-alone configuration; a maximum number of first level facilities to be moved from a stand-alone configuration to a hub location; and a maximum number of first level facilities to be moved from one hub location to another hub location.

5. The method as defined in claim 1 wherein the method further comprises the step of
forcing all designated moves of first level facilities from an endpoint e to a unique hub location.

6. The method as defined in claim 1 wherein the first level facilities are defined as T1 facilities and the second level facilities are defined as T3 facilities.

7. The method as defined in claim 1 wherein the first level facilities are defined as DS0 facilities and the second level facilities are defined as T1 facilities.

8. The method as defined in claim 1 wherein the first level facilities are defined as T3 facilities and the second level facilities are defined as OC48 facilities.

9. The method as defined in claim 1 wherein the method is performed for first, second and third levels of facilities.

10. The method as defined in claim 9 wherein the method is further performed for a fourth level of facility.

11. The method as defined in claim 1 wherein the method further comprises the step of:
reconfiguring access network topology in accordance with the cost optimized number of first and second level facility assignments by:
adding proposed second level facilities to identified hub locations;
selecting second level facilities to be disconnected;
selecting first level facilities to be moved from one hub location to a new hub location and determining specific multiplexer assignments for the first level facilities at the new hub location; and
clearing second level facilities to be disconnected by reassigning associated first level facilities to other second level facilities at the same hub location.

12. The method as defined in claim 11 wherein in performing the step of selecting second level facilities to be disconnected, the second level facilities associated with the fewest number of first level facilities is selected.

13. The method as defined in claim 11 wherein in performing the step of determining specific multiplexer assignments for moved first level facilities, the method determines the assignment based upon second level facilities to be remaining after disconnection of some second level facilities.

* * * * *